June 20, 1933.  B. BRONSON  1,914,399
FLOORING FOR VEHICLES
Original Filed April 14, 1928   5 Sheets-Sheet 2

June 20, 1933.　　　　B. BRONSON　　　　1,914,399
FLOORING FOR VEHICLES
Original Filed April 14, 1928　　5 Sheets-Sheet 4

Patented June 20, 1933

1,914,399

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

FLOORING FOR VEHICLES

Application filed April 14, 1923, Serial No. 269,902. Renewed November 9, 1932.

This invention relates to floorings for motor vehicles and has for its chief object to provide an improved flooring which overcomes the numerous disadvantages of the prior floorings which have been unsatisfactory because, as a rule, they do not fit closely so that air, exhaust gases and dust leak through them; they give rise to considerable squeaking, due to the flexing or weaving of the vehicle body, and they require the use of mats or carpeting, and these frequently fit poorly, become loose, and are generally unsatisfactory.

In carrying out my invention, I provide a flooring composed of closely fitting members which are formed of metal, such as steel in the form of stampings, covered with a nonmetallic material, such as rubber, vulcanized or secured thereto so as to, in effect, form an integral part thereof.

By my improved construction a range of adjustment is provided to take care of varying dimensions both lengthwise and crosswise of the car body, so as to provide a closely and tightly fitting floor for each car body. The construction in some of its forms includes specially formed longitudinally extending sill strips which are adapted to overlie and to be secured to the body sills, whether formed of metal or wood, and the floor boards proper are adapted to have interfitting and generally snap connections with the edges of the sill strips. These sill strips may be adjustably secured to the sills so as to compensate for variations in the width of the body compartments. In other constructions, the body sills are so formed as to make it advisable to dispense with the sill strips except opposite the inclined toe boards, in which event the floor boards are longer and are otherwise fastened in place. These features, in conjunction with adjustable adapters which extend transversely across the rear of the front compartment and preferably across the front and rear portions of the rear compartment and with which the boards have interfitting engagement, provide complete floorings with closely associated interfitting parts closed against any substantial leakage of air, dust and exhaust gases and the engaging portions fitting together metal to rubber so as to be incapable of giving rise to squeaking by relative movement between the parts while the car is in motion.

The invention may be briefly summarized as consisting in certain novel details of construction and combinations and arrangements of parts which will be described in the specification and set forth in the appended claims.

Figure 1:
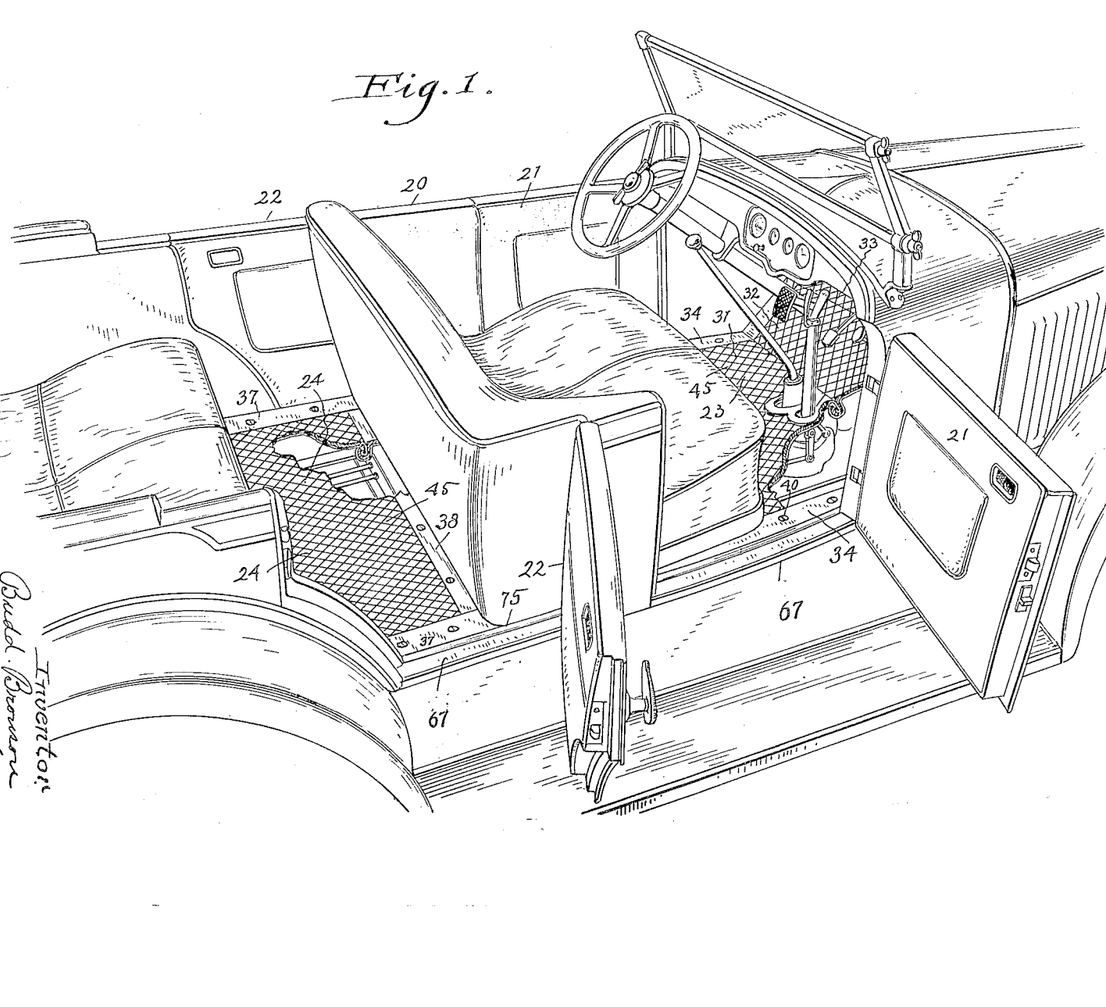
Fig. 1 is a perspective view of a car of the touring type having front and rear compartments, the floorings of the front and rear compartments being formed, arranged and applied in accordance with the present invention.

Referring to Fig. 1, 20 designates the car body having front doors 21 leading to the front compartment and rear doors 22 leading to the rear compartment. The flooring of the front compartment is designated as a whole by the reference character 23 and the flooring of the rear compartment by the reference character 24, both having portions broken away to indicate the construction involved.

Generally, the flooring of each compartment is formed of a number of pieces, for convenience of assembly and to compensate for variations in the transverse and front to rear dimensions, for it has been found that even with cars of a given style made by a given manufacturer the inside dimensions of the compartments vary, and, accordingly, to provide a tight compartment substantially closed against the leakage of air and dust and exhaust gases, it is important that provision be made for adjustment in both directions relative to the parts of the car which support the flooring. Additionally, the body frames of different manufacturers differ not only widely in dimensions but also in the construction and materials used in forming the body frames, thus necessitating variations in the construction of the flooring to meet these varying conditions. Accordingly, some of the details of the design of the flooring must be selected in view of the construction of the car for which the flooring is intended, and these details will vary with respect to details of floorings for cars produced by other manufacturers. It will be understood, of course, that the dimensions of the parts making up the flooring must be selected in accordance with the design and size of the car. Accordingly, the dimensions and details will be selected for a particular type or model of car of a given manufacture and the adjustments provided by my improved flooring will allow the desired tight or closely fitting flooring to be applied by the manufacturer to all cars which he may produce of that particular type or model.

It might be stated before referring further to the drawings that in so far as the flooring for the front compartment is concerned it is generally the case that the horizontal and inclined portions are formed separately, these being generally termed the floor board and the toe board, and it is preferable also that the toe board be formed in two parts for convenience of assembly of the car operating parts which extend through the toe board and also to provide accessibility for adjustments and repairs.

Figures 2, 3, 4, 5, 6:
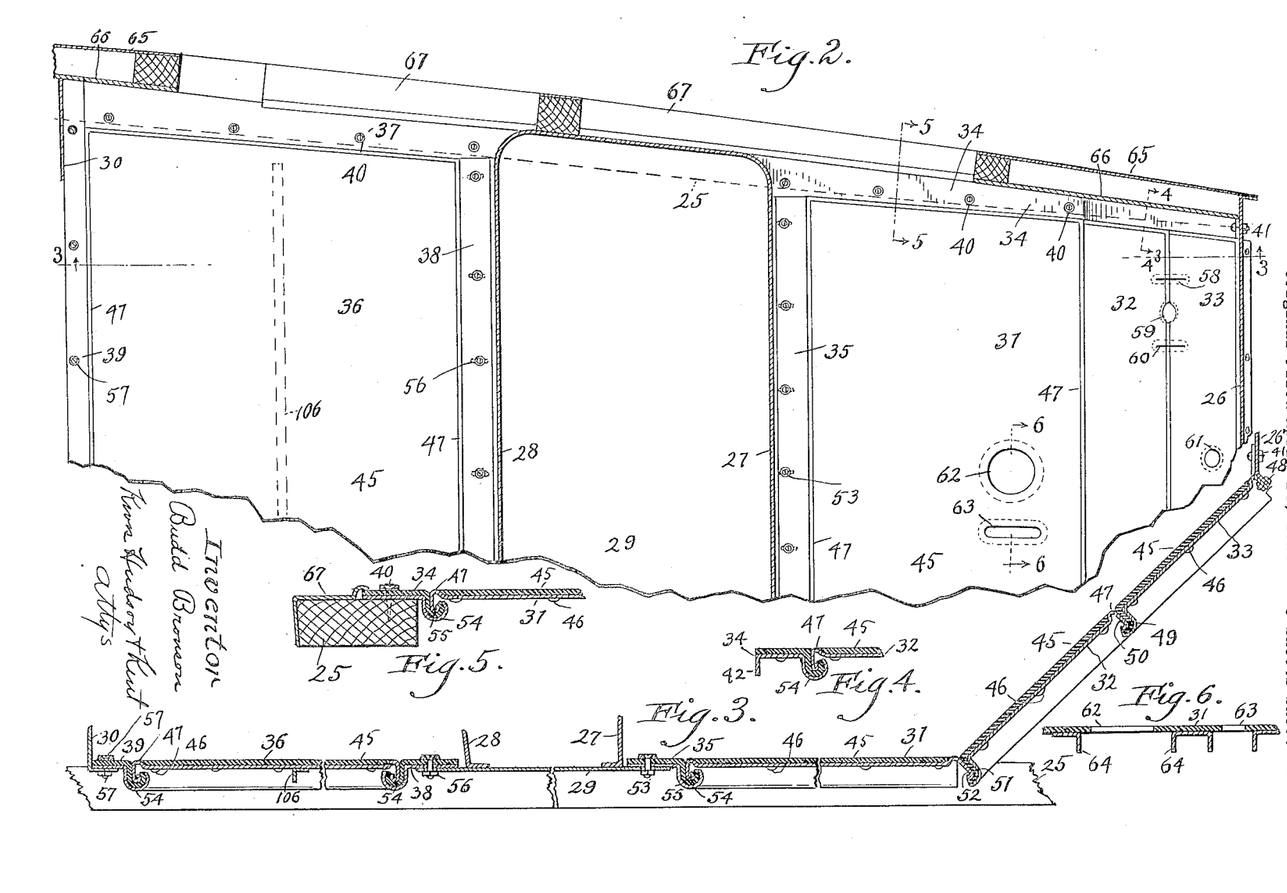
Fig. 2 is a horizontal section showing the floorings in plan, omitting portions of the car and car body not essential to the invention.
Fig. 3 is a section along the line 3—3 of Fig. 2 on an enlarged scale and with portions broken away.
Figs. 4, 5 and 6 are detail sectional views along the lines 4—4, 5—5 and 6—6 respectively of Fig. 2.

Referring now to Fig. 2, I have here illustrated enough of the car to show the complete flooring for the front and rear compartments. The body construction herein illustrated includes wooden body sills which are adapted to be supported on the chassis frame which is not illustrated, these wooden body sills being shown at 25 by full lines in Figs. 3 and 5 and being indicated by dotted lines in Fig. 2. It might be mentioned that a portion of the dash panel is indicated at 26, the front and back panels for the front seat are indicated at 27 and 28, the bottom panel for the front seat is indicated at 29, and the front panel for the rear seat is indicated at 30. These parts which enter into the construction of the car proper are mentioned because they constitute parts to which my improved flooring is attached.

The flooring for the front compartment, in this instance, includes three main boards or plates which are designated 31, 32 and 33. The former is used in forming the horizontal portion of the floor of the front compartment and the latter two constituting toe boards or plates employed in forming that part of the floor of the front compartment which is inclined. In addition, the flooring of the front compartment includes a pair of side strips which, for convenience, will be termed sill strips, these being designated 34. Only one is shown in Fig. 2, but it will be understood that the construction at both sides is the same. These sill strips overlie the body sills 25 and form side portions of the flooring for the front compartment. Still further, the flooring for the front compartment includes an adjustable adapter 35 which extends crosswise of the compartment just in front of the front seat.

The flooring for the rear compartment is, in this instance, composed principally of a floor board or plate 36, and, in addition, a pair of sill strips 37, a front adapter 38, and a rear adapter 39, the adapter 38 extending crosswise of the rear compartment immediately at the rear of the front seat and the adapter 39 extending across the compartment immediately in front of the rear seat.

In general, it may be stated that the boards 32 and 33 have interfitting engagement with each other at their meeting edges and these boards all have interfitting engagement with the inner edge portions of the sill strips and the board 31 has interfitting engagement with the front edge of the adapter 35. Likewise, the floor board 36 for the rear compartment has similar interfitting engagement with the adjacent edges of the sill strips 37 and the front and rear adapters 38 and 39. Furthermore, it might be here stated that the sill strips 34 and 37 may be so applied to the sills as to compensate for variations in the width of the compartments, for example by the means illustrated in Figs. 7 and 10, which is fully described hereinafter. Likewise the adapter 35 and either the adapter 38 or 39 may be adjustably attached to the members which support them so as to compensate for variations in dimensions lengthwise of the compartment.

The sill strips 34 which support the ends of the boards 31, 32 and 33, have horizontal portions which rest upon and extend longitudinally of the sills 25 and they have forward portions which extend upwardly in conformity with the inclination of the toe boards 32 and 33. The horizontal portions of the strips are here shown secured to the body sills 25 by screws 40 while the upper front end of each sill strip is attached to the dash panel 26 by a bolt 41. If desired, the horizontal and inclined portions of each of these two sill strips may be formed in two separate parts or these portions may be formed continuous or in one piece, as indicated in Fig. 2. The sectional view of Fig. 4 shows that the forward inclined portions of these sill strips are flanged downwardly along their outer edges, as indicated at 42, this being provided for stiffening purposes since the inclined portions of these strips are unsupported except at their ends. This flange is preferably omitted from the horizontal portions of the strips which rest upon the body sills 25, as indicated in Fig. 5.

All the pieces which enter into the construction of the flooring, i. e., the toe and floor boards proper, the sill strips and adapters, are preferably formed of composite members of metal and rubber. These parts are preferably formed of steel stampings each having a sheet or layer of rubber, designated by the reference character 45, molded in contact therewith and vulcanized thereto, the rubber covering the whole or the major portion of the top surface of the sheet steel. In applying the rubber and causing it to adhere to the sheet steel, two expedients are preferably employed. In the first place, each steel stamping is perforated at a plurality of points and in the molding and vulcanizing operation the rubber is squeezed through the perforations and the equivalent of rivet heads are formed on the under side of the sheet steel, these rubber rivets being indicated at 46. In this way the sheet or layer of rubber is positively fastened to the sheet steel at spaced points, the number of which may be varied as found necessary or desirable. Additionally, I may cause the rubber to adhere substantially uniformly to the face of the sheet steel by giving it a surface roughening, as by the use of hot-passed steel wherein the final rolling operation takes place with the steel in a heated state. The surface roughening inherent or incident to hot-passed steel enables me to obtain a firm adherence of the rubber to the face of the steel and assists the rubber rivets 46 in making a permanent union between the rubber and steel which will prevent the rubber loosening up.

With the form of the invention illustrated in Figs. 2, 3, 4 and 5, the boards have shallow depressions inside their margins, leaving upstanding marginal beads 47 around either three or four sides of the boards, these shallow depressions being filled with the rubber. The top surfaces of these beads are exposed and constitute substantially the only metal exposed portions of the flooring and they may be ducoed or otherwise given a rustproof, durable finish. However, it is not necessary to depress the boards where they are rubber covered, and the rubber may come entirely up to the edges, in which event where the boards and other pieces of the flooring meet the rubber of one piece will be continuous or flush with the rubber of the adjoining piece, leaving no exposed metal. This is illustrated in some of the other forms of the invention to be explained presently.

The upper toe board 33 is provided along its upper margin with a flange which is preferably bolted, as illustrated at 48 in Fig. 2, to the dash panel 26. At its lower margin the metal is carried downwardly, forming a groove or hook 49 and the rubber is carried down over the face of this hook. At the upper edge of the companion toe board 32 the metal is flanged downwardly and the free edge is curved inwardly or beaded, as illustrated at 50, and this flange rests in the rubber covered hook 49 of the toe board 33. At its lower edge the board 32 has a rubber covered hook 51 similar to the hook 49 and this receives a suitable flange 52 with a hook or bead at its free edge formed at the forward edge of the floor board 31, the flange 52 being angularly disposed so as to lie closely within the hook portion 51 of the lower toe board 32. In this way, the boards 33, 32 and 31 are in supporting relation throughout their longitudinal edges.

The adapter 35 is secured to that portion of the bottom panel 29 of the front seat which projects forwardly of the front seat, the adapter being secured to this portion of the panel by a series of spaced bolts 53. These bolts pass through elongated openings formed in the panel 29 (which in this instance is formed of sheet metal) so as to admit of an adjustment of this adapter with reference to the support to which it is secured to suit the lengthwise dimension of the front compartment of the car. If desired, the elongated openings may be formed in the adapter 35 as well as in the adapter of the rear compartment which is adjustably secured in place relative to its supporting member. The rubber rivets which are on the under side of the adapter 35 and the rubber rivets which are on the under side of the adapters 38 and 39 rest or bear against the supports for these adapters so that there is no engagement of metal to metal in the support of the adapters. The forward edge of the adapter 35 is provided with a rubber covered hook 54 which receives with a snap action a downturned flange 55 formed at the rear longitudinal edge of the board 31.

The sill strips 37 for the rear compartment are also secured to the sills by screws 40 and the adapters 38 and 39 of the rear compartment are secured by bolts 56 and 57 to their respective supports and the openings (formed in the support or, if desired, in the adapter) through which one set of these bolts extend are elongated so that the flooring of the rear compartment can be adjustably applied to compensate for variations in the front to rear dimensions of the rear compartment. The inner edges of these adapters likewise have rubber covered hooks 54 at their free edges and these receive with a snap action flanges at the front and rear longitudinal edges of the board 36 which flanges, like the flange 55, have edges which are curled or beaded, as shown in the drawings.

As previously stated, the sill strips 34 and 37 are secured by screws 40 to the sills 25 and inasmuch as the body construction in Fig. 2 has wooden sills, these screws can be driven in wherever necessary to suit the widths of the compartments, likely variations in the width of the compartments being taken into consideration in designing and proportioning the floorings in so far as width dimensions are concerned. These sill strips are provided along their inner edges with rubber covered hooks 54 similar in all respects to the hooks provided along the longitudinal edges of the adapters and these rubber covered hooks receive with a snap action downturned flanges formed on the ends of all of the boards 31, 32, 33 and 36, these flanges being rounded or beaded at their edges similar to the flanges formed on the longitudinal edges of these boards.

Accordingly, the board 36 of the rear compartment has snap connections on all its four sides with the adapters and sill strips and the board 31 of the front compartment has similar snap connections at its rear edge and ends with the adapter and sill strips respectively while the toe boards 32 and 33 are similarly connected with the inclined portions of the sill strips. In this way, close connections are made, metal to rubber, and the boards are removably fitted in place.

The inclined portion of the flooring of the front compartment is provided with suitable openings 58, 59, 60 and 61 to accommodate the clutch lever, steering column, service brake pedal and starter pedal or knob, and the floor board 31 is provided with openings 62 and 63 to accommodate the gear shift lever and the emergency brake lever. In forming all these openings, the openings formed in the metal are somewhat greater than the openings formed in the rubber so that the rubber will overhang the metal to prevent metal to metal contact between the boards and the operating parts which extend through them. In forming these openings in the metal, the latter may be flanged downwardly as indicated at 64 in Fig. 6.

In Fig. 2 I have indicated at 65 a portion of the body panels, and at 66, opposite the toe boards and portions of the floor boards, part of the upholstery is indicated, this latter being shown contacting the ends of the boards. In Figs. 1 and 5 I have shown at 67 metal door sills such as are customarily employed on motor vehicles, these door sills at their inner edges overlapping the sill strips of the flooring. These parts 65, 66 and 67 form no part of the invention and need not be further referred to.

Figure 7:
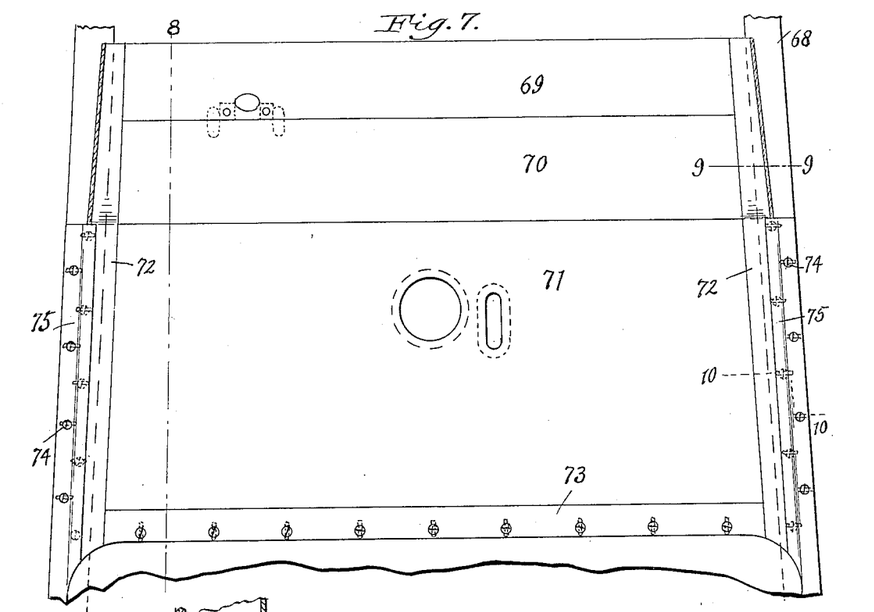
Fig. 7 is a sectional plan view showing the front compartment only, the latter having a flooring applied to a car body having a metal body frame, whereas the construction of Figs. 2 to 6 has a wooden body frame.
Figures 8, 9, 10:
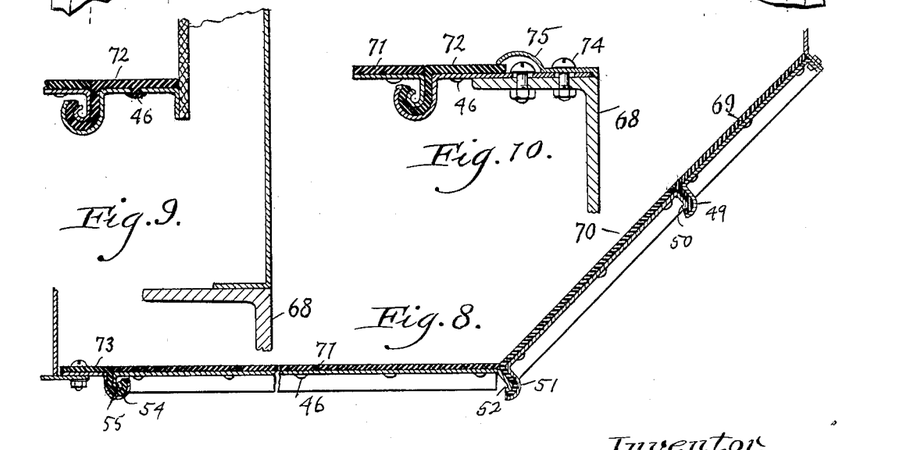
Figs. 8, 9 and 10 are sectional views respectively along the lines 8—8, 9—9 and 10—10 of Fig. 7.
Figure 11:
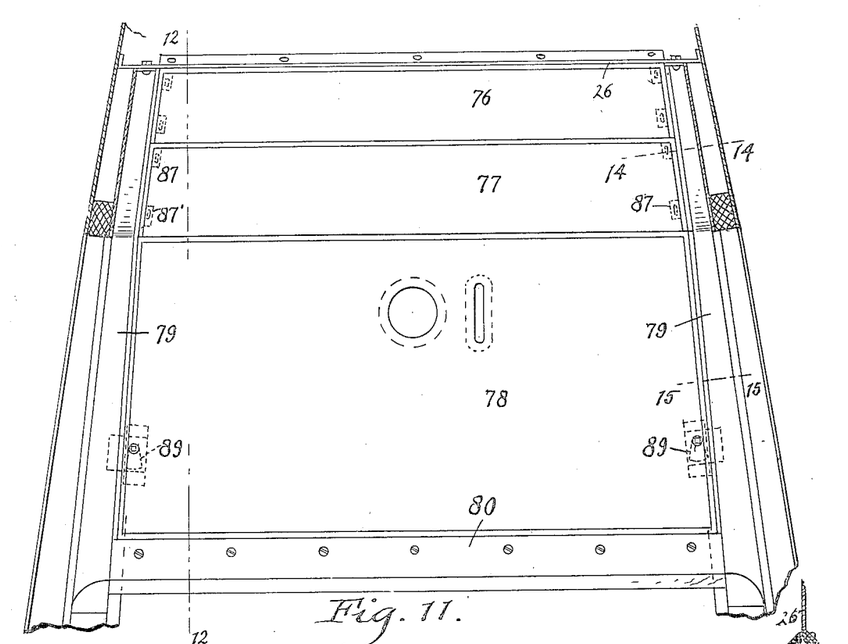
Fig. 11 is a view corresponding to Fig. 7, showing a modification.
Figures 12, 13, 14, 15:
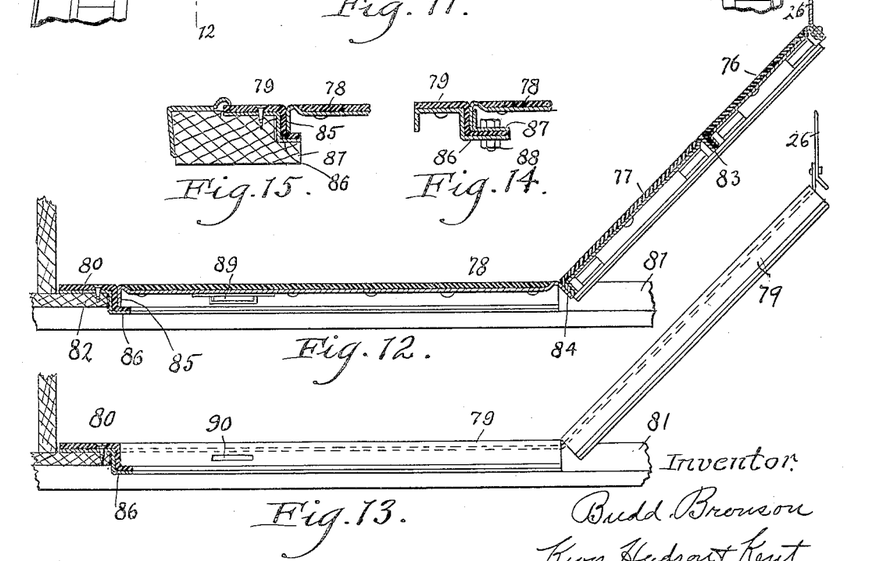
Fig. 12 is a sectional view along the line 12—12 of Fig. 11.
Fig. 13 is a similar view but with the flooring in side elevation.
Figs. 14 and 15 are detail sectional views along the lines 14—14 and 15—15 of Fig. 11.

In Figs. 7, 8, 9 and 10 I have shown a construction quite similar to that illustrated in Figs. 2 to 6 except that metal body sills 68 are employed, note Figs. 7 and 10, instead of the wooden body sills 25, illustrated in Figs. 2, 3 and 5. In Figs. 7 and 8 the flooring for the front compartment is illustrated, this flooring including inclined toe boards 69 and 70, a horizontal floor board 71, two sill strips 72 which are arranged as heretofore described, and an adapter 73. All these parts, as with the previously described construction, are composite members preferably of rubber and steel, the rubber being applied and secured to the surface of the sheet steel and interlocked therewith by rubber rivets or equivalent interlocking means, as described heretofore. In this instance, however, the boards 69, 70 and 71 are not panelled or recessed where covered with the rubber and the rubber covers the entire top surface of all the boards as well as all exposed portions of the sills and adapter and where the boards fit together or with the sills and adapter the rubber on one part is flush with the rubber on the other so as to form a substantially continuous or unbroken rubber surface throughout the entire flooring. As in the prior construction, the metal of the adapter or of the adapter support has elongated openings through which pass the bolts which secure it to its support so as to compensate for variations in the front to rear dimension of the compartment. Since metal body sills 68 are employed instead of wooden sills, as in the first described construction, the sill strips 72 are provided with elongated openings (note Fig. 10), through which pass bolts 74 which secure these strips to the top flanges of the body sills 68 so as to compensate for variations in the width of the compartment. In this instance, the metal door sills 75 overlap the rubber of the sill strips and are secured in place by the outer bolts 74 which are utilized to secure the sill strips to the body sills. The five parts constituting the flooring are supported along their edges in the manner previously described and provide a tight and closed construction with the floor board and lower toe board readily removable when desired.

The rear compartment, which is not illustrated, will have a flooring similar to that employed from the front compartment except that as with the construction first described it will consist of the two sill strips, the two adapters and the floor board, the parts being applied and fastened together as previously described.

In Figs. 11 to 15 I have shown a construction wherein the flooring is composed of the same parts previously described, but the parts are fitted and fastened together in a somewhat different manner. Here again I have illustrated only the front compartment, the flooring of which includes the two inclined toe boards 76 and 77, the floor board 78, the two sill strips 79 and the adapter 80. The sill strips are secured to wooden body sills 81 and the adapter is secured to a wooden support 82 permitting these parts to be secured in place by screws, it being understood that compensation can be made for variations in the front to rear and crosswise dimensions of the compartment by securing these sill strips and adapter to the wooden members where desired to make a tight closed construction regardless of the variations in the dimensions such as are met with in practice. Here again the parts composing the flooring are preferably formed of rubber and steel with the rubber vulcanized and secured to the steel, as heretofore described, and the boards may be panelled or recessed where covered with rubber, as here shown, or they may not be recessed, as in the second construction described.

With the construction now under consideration, the parts are not fastened together with a snap action. The upper edge of the toe board 76 is flanged and secured in place to the dash panel, as heretofore, but the meeting edges of the boards 76 and 77 and the meeting edges of the boards 77 and 78 are simply flanged downwardly, as indicated at 83 and 84, the rubber on one board being carried down over the face of the flange so that the flanges will bear together rubber to metal at each of the points 83 and 84. The rear longitudinal edge of the board 78 and the ends of all the boards 76, 77 and 78 are flanged downwardly as shown at 85, and these flanges rest upon rubber covered shoulders 86 formed at the front edge of the adapter and on the inner edges of the sill strips. These shoulders are preferably formed in each instance by flanging the metal downwardly and then inwardly. In each instance the flange 85 of the board fits tightly the rubber covered shoulder so as to make closed joints where the parts are fitted together. This construction requires that the parts be positively fastened together and to accomplish this the ends of the toe boards have angles 87 spot-welded or otherwise secured to the inner surfaces of the flanges 85, note Figs. 11 and 14, and these are secured to the inwardly extending flanges of the rubber covered shoulders 86 by short bolts 88. The floor board 78 is removably secured in place by pivoted locking tongues 89, see Figs. 11 and 12, which are carried by the boards near their ends and on the under sides of the boards and are adapted by a suitable tool such as a wrench which can be applied to stems projecting from the tongues through the boards to be swung inwardly so as to engage in openings 90 formed in the vertical flanges of the rubber covered shoulders 86 of the sill strips and also in the sill strips themselves. To lock the floor board in place, these locking tongues are swung inwardly so that they extend into the openings referred to and when it is desired to remove the board these locking tongues will be swung outwardly, thus permitting the board to be lifted from place. The rear compartment may be similarly formed of the floor board, adapters and sill strips, the sill strips and adapters being secured in place as heretofore described and the floor board to be supported on the sill strips and adapters as with the flooring of the front compartment, and the floor board may be locked in place like the floor board of the front compartment.

In Figs. 16 to 19, I have shown a flooring for the front compartment which is somewhat differently formed from the first described constructions. In this instance, the flooring consists of toe boards 91 and 92 and a floor board 93, an adapter 94 and two short sill strips 95 which are located opposite the ends of the toe boards only and are secured at their upper ends to the dash panel as heretofore and at their lower ends are bolted or otherwise secured to the body sills, as indicated at 97. In this instance, these body sills are formed of upwardly facing channels 98 which are secured onto the chassis frame members or channels 99. In this construction the sill strips are not utilized in conjunction with the floor board 93 but the floor board and also the adapter 94 are of greater length than in the constructions first described, the floor board and adapter extending across the compartment over and to substantially the outer sides of the body sills 98 (note Figs. 16 and 19).

The toe boards are connected together at their longitudinal edges and the floor board is connected along its forward edge with the lower toe board and along its rear edge with the adapter, as in the construction first described, and shown on Sheet 3 of the drawings. Likewise, the ends of the toe boards are secured to the sill strips 95 in the manner illustrated on Sheet 2 of the drawings.

Figures 16, 17, 18, 19:
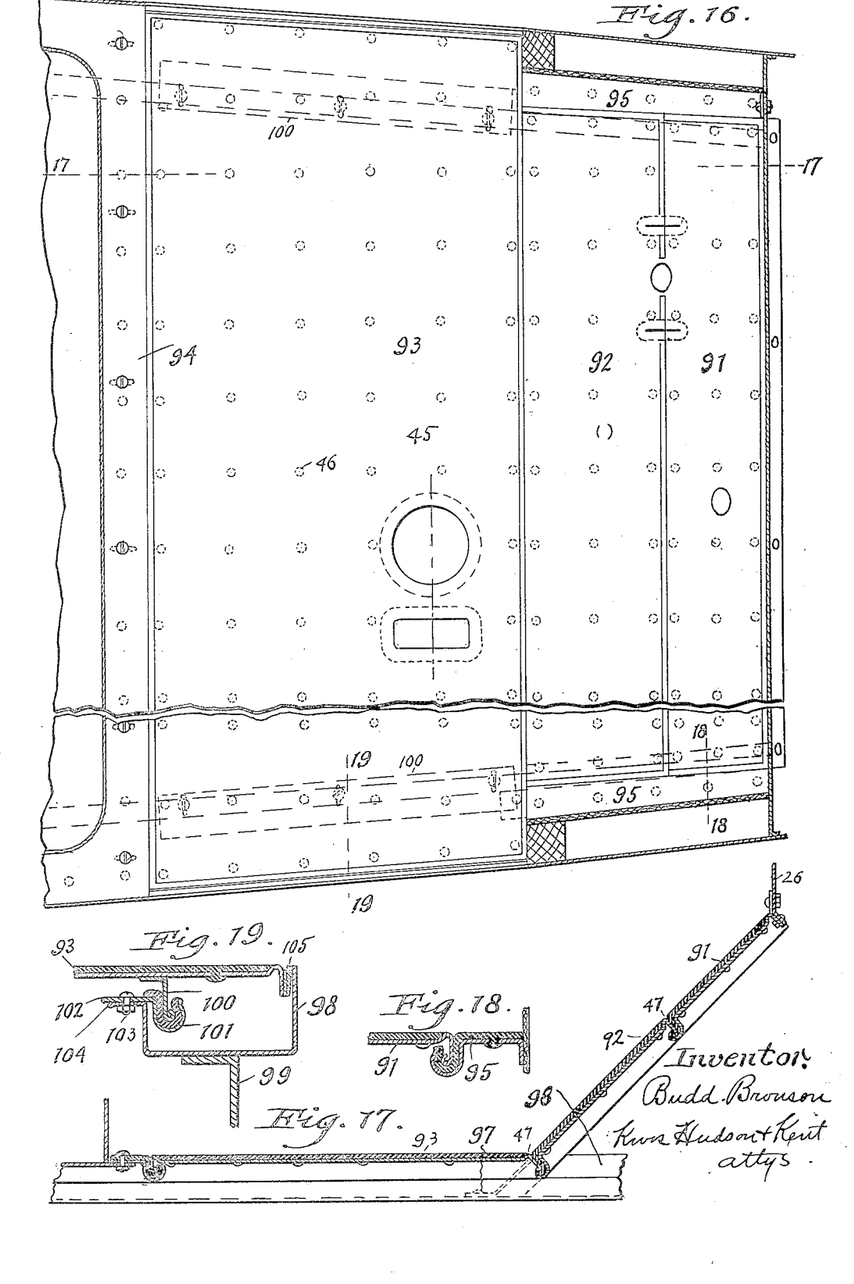
Fig. 16 is a view corresponding to Figs. 7 and 11 showing a further modification.
Fig. 17 is a sectional view along the line 17—17 of Fig. 16.
Figs. 18 and 19 are detail sectional views substantially along the lines 18—18 and 19—19 of Fig. 16.

To secure the ends of the floor board 93 in place, there is attached by spot-welding or otherwise to the under side of the board 93 near its ends two downturned flanges 100 each with an upturned or rounded bead at its free edge, these flanges extending crosswise of the board near the ends of the latter, note Figs. 16 and 19. These flanges fit with a snap action into rubber covered hooks 101 formed on metal strips 102 which are secured by bolts 103 to flanges 104 formed along the inner edges of the channel-shaped upwardly facing body sills 98. The strips have elongated openings so that they may be adjustably secured to the body sills so as to compensate for variations in the spacing of the body sills in a crosswise direction, and of course the adapter 94 is adjustably secured in a similar manner to its support.

Inasmuch as variations in the width of the front compartment and in the crosswise spacing of the body sills 98 may result in varying the distances between downturned flanges at the ends of the board 93 and the upwardly extending flanges on the outer sides of the channels 98, it may be desirable, should any material space exist between the flanges on the ends of the board and the flanges of the sills, to provide filler strips 105 to close these spaces or openings. These filler strips may consist of strips of metal rubber-covered on their outer faces, as illustrated in Fig. 19, and they may be secured to the flanges along the ends of the board 93 in any suitable manner, as by spot-welding or by a suitable hook connection. With this construction metal door sills, such as the door sill 67 of the construction first described on the door sill 75 of the construction secondly described, may be employed.

It will be understood that the rear compartment may consist of two adapters and a floor board adapted to be extended crosswise of the car and to be secured in place like the floor board 93 of the front compartment.

The floorings embodying my invention in its broadest aspect may be modified in many other particulars, for example, while I have mentioned the metal portions of the floorings as being preferably formed of steel stampings they may be otherwise formed of metal and I, therefore, do not desire to limit myself to stampings. Furthermore, although I have mentioned the fact that the metal members are covered with non-metallic material, preferably rubber, still I do not wish to be confined to rubber for, in some instances, other non-metallic surfacing material may be used, in which event it will be suitably applied and secured to the metal so as to form integral or unitary members of metal and of the non-metallic surfacing material.

Additionally, the metal members of the flooring, particularly if formed of stampings, may obviously be strengthened and braced where necessary to withstand bending and vibration. It will be apparent that the flanging herein shown around the margins of the metal members stiffens and strengthens them but they may be further stiffened inside their margins in various ways, as by forming them with indentations, valleys and ribs, or by attaching bracing members to them. In Figs. 2 and 3 I have shown, by way of example, the board 36 braced by an angle member 106 spot-welded or otherwise secured to the under side of the board. Members of this type or equivalent strengthening means may be provided in any of the parts of the flooring wherever strengthening or bracing may be necessary or desirable.

It will be obvious that with the use of my improved flooring composed of metal surfaced with rubber or other suitable non-metallic material, the necessity of separate floor coverings such as rubber mats, carpeting and the like is entirely eliminated. The rubber or other non-metallic covering material applied to the metal and formed integrally with or as a permanent part of the boards may be given any desired surface design or configuration. The top surface may be plain or it may be molded with a suitable artistic design or configuration. In Fig. 1 I have shown the toe and floor boards formed with a molded diamond design, but, obviously, any other design, such as ribbing, may be employed. The artistic surface design may be applied to all the parts composing the flooring, but in Fig. 1 the surface of the non-metallic material on the sill strips and adapters is shown plain to more clearly indicate the construction.

I, therefore, aim in my claims to cover all modifications which do not involve a departure from the spirit and scope of the invention.

Having thus described my invention, I claim:

1. A flooring for motor vehicles comprising stampings including a floor board extending crosswise of the compartment, and an adapter extending across the end of the compartment and adjustably attached to a supporting part of the vehicle so that it may compensate for variations in the dimensions of the compartment, said floor board and said adapter having cooperating depending portions.

2. A vehicle body having a compartment provided with flooring composed of longitudinally extending supporting members along the sides of the compartment adjustably attached to supporting portions of the body, and a floor board having supporting connections with said members.

3. A vehicle having a compartment with a flooring composed of longitudinally extending side strips adjustably supported by parts of the vehicle, a transversely extending strip adjustably attached to another portion of the vehicle, and a metal floor board in the form of a stamping having supporting connections with said strips.

4. A vehicle having a compartment with a flooring composed of longitudinally extending side strips adjustably supported by parts of the vehicle, a transversely extending strip adjustably attached to another portion of the vehicle, and a metal floor board in the form of a stamping having supporting connections with said strips and removably attached thereto with a snap action.

5. A vehicle having a compartment and a flooring therefor composed of a plurality of members formed of metal and non-metallic covering secured thereto, said members having interengaging supporting portions and some of said members being adjustably attached to portions of the vehicle to form a tight flooring for the entire compartment.

6. A flooring for the front compartment of a motor vehicle comprising rubber covered metal sill strips extending lengthwise along the sides of the compartment, a rubber covered adapter extending crosswise of the compartment at the rear side thereof, a substantially horizontal rubber covered floor board, a rubber covered inclined toe board, the boards being supported at their ends on the sill strips, the front and toe boards being in supporting relation along their longitudinal edges and the floor board being in supporting relation with the adapter.

7. A flooring for the rear compartment of a motor vehicle comprising longitudinally extending sill strips along the sides of the compartment, transversely extending adapters, one adjustably supported at the front and rear of the compartment, and a floor board supported at its edges by the adapters and sill strips.

8. A flooring for the rear compartment of a motor vehicle comprising longitudinally extending sill strips along the sides of the compartment, transversely extending adapters, one adjustably supported on the vehicle at the front and rear of the compartment, and a floor board supported at its edges by the adapters and sill strips, all said parts being formed of metal stampings covered with non-metallic material intimately attached thereto.

9. A vehicle having a compartment with a flooring including sill strips connected to sills of the vehicle, said sill strips having depending supporting portions, and floor boards having depending flange portions in engagement with said supporting portions.

10. A vehicle having a compartment with a flooring including sill strips connected to sills of the vehicle, said sill strips having depending supporting portions, floor boards having depending flange portions in engagement with said supporting portions, and resilient means interposed between the supporting portions of said strips and the depending flange portions of said floor boards.

11. The combination with a motor vehicle having a compartment, and floor supporting means associated therewith, of a flooring for said compartment carried by said supporting means and comprising a plurality of substantially rigid contiguous floor elements, and rubber covering substantially uniformly attached to the top surface of each of said elements to provide a substantially continuous rubber floor surface when said elements are in assembled contiguous relation.

12. The combination with a motor vehicle having a compartment, and floor supporting means associated therewith, of a flooring for said compartment carried by said supporting means and comprising a plurality of substantially rigid contiguous floor elements, and rubber covering secured to the top surface of said floor elements, the rubber covering of one of said elements being extended down over an edge thereof to provide a packing between said one element and an adjacent element.

13. The combination with a motor vehicle having a compartment, and floor supporting means associated therewith, of a flooring for said compartment comprising a plurality of substantially rigid contiguous floor elements carried by said supporting means, and rubber covering vulcanized to top and edge portions of said elements to provide a substantially continuous rubber floor surface when said elements are in assembled contiguous relation and to provide a packing between contiguous edges of adjacent elements.

14. The combination with a motor vehicle having a compartment, and floor supporting means associated therewith, of a plurality of substantially rigid contiguous floor elements including connecting members adjustably attached to said supporting means and transverse members engaging said connecting members, and rubber covering secured to the top surface of said floor elements, the rubber covering of one of said elements being extended down over an edge thereof to provide a packing between said one element and an adjacent element.

15. The combination with a motor vehicle having a compartment, and floor supporting members associated therewith, of a flooring for said compartment comprising substantially rigid floor members carried by said supporting members, certain of said members having rubber covering substantially uniformly attached to their top surface and integrally extended over edge portions thereof to provide a packing between the same and portions of the members cooperating therewith.

16. The combination with a motor vehicle having a compartment, of a flooring for said compartment including a substantially rigid floor board, means having supporting cooperation with an edge portion of said floor board, and rubber covering substantially uniformly attached to the top surface of said floor board and extended over said edge portion to provide a packing between said means and said floor board.

In testimony whereof, I hereunto affix my signature.

BUDD BRONSON.